PRIOR ART $T_U$ JUNCTION

INVENTOR
Alfred J. Cote, Jr.

BY [signature]

ATTORNEY

PRIOR ART $T_b$ JUNCTION

PRIOR ART $T_f$ JUNCTION

INVENTOR
Alfred J. Cote, Jr.

BY [signature]

ATTORNEY 3,337,752

NEURISTOR CONTROLLED GATE EMPLOYING TRIGGER-COUPLED JUNCTIONS

Alfred J. Cote, Jr., Silver Spring, Md., assignor to the United States of America as represented by the Secretary of the Navy Filed Apr. 27, 1965, Ser. No. 451,364
10 Claims. (Cl. 307—88.5)

ABSTRACT OF THE DISCLOSURE

A neuristor gating circuit having first and second $T_b$ bifurcated neuristor junctions connected respectively to first and second neuristor paths; the respective bifurcated sections of said first $T_b$ junction being connected to the respective bifurcated sections of said second $T_b$ junction via third and fourth neuristor paths. A T trigger neuristor junction, in either said third or fourth neuristor path, is adapted for connection, via a fifth neuristor path, to the anode of a $T_u$ neuristor junction; the cathode of said $T_u$ junction is adapted for connection, via a sixth neuristor path, to a source of control pulses so that application of a control pulse causes annihilation of the signal pulse in said third or fourth neuristor paths and accordingly interrupts propagation between said first and second neuristor paths thereby functioning as a neuristor signal gate for controlling signal passage between said first and second neuristor paths.

The invention described herein may be manufactured and used by or for the Government of the United States of America for governmental purposes without the payment of any royalties thereon or therefor.

The present invention relates generally to neuristor gating circuits and more particularly to a simplified means of interrupting or modulating information flow in neuristor systems which employ only trigger coupled neuristor junctions or require minimum use of refractory junctions. The present invention satisfies a basic requirement in realizing a variety of functional characteristics in both digital and analog neuristor systems.

I. *The neuristor device*

The neuristor is an active transmission line having properties similar to those of a neuron's axon. A wide variety of information processing functions can be realized by appropriately interconnecting networks of neuristors without recourse to transistors, tubes, resistors, capacitors, coils, or other electronic devices.

The neuristor is a device concept suggested by the propagation mechanism employed by the axon portion of the neuron. The axon is an active transmission line which propagates a pulse without attenuation, and the propagating pulse takes the form of a moving discharge which can be compared to the propagating flame front moving along a chemical fuze. The difference between the two, however, is that the fuze cannot be used again while the axon can support propagation for an indefinite number of times provided that it has had sufficient time to recover to its initial state before each new discharge is triggered.

If an axon is examined at one moment in time when a single pulse is propagating along its length, there will be three distinct regions in evidence. One region is the portion of the axon which the pulse has not yet reached and this portion is in a charged or standby condition. The pulse itself is at the discharged portion of the axon while the portion of the axon over which the pulse has just travelled is in an unstable or partially discharged state and this latter portion will recover to its initial or charged state after a finite time.

A better analogy to the propagating pulse of the axon is that of the spread of flame in a forest fire. The unburned forest is in a charged state prior to being ignited in flame by a lightning bolt. The discharge (flame) then spreads automatically to the charged (unburned) portion of the forest. The flame leaves in its wake a discharged (burned) region which, after a period of time (several years), recovers to a charged state again. Only after recovery can it support a new propagation of flame. This phenomena is analogous to the essential functional featupres of the axon, and these features are embodied in the neuristor.

The neuristor was originally proposed by H. D. Crane and a description thereof is disclosed in Crane's article entitled, "Neuristor—A Novel Device and "System Concept," IRE, volume 50, pages 2048–2060 (October 1962). The neuristor device decribed in this article is a wire-like structure fabricated with appropriately distributed materials and immersed in a distributed power supply. The wire of the device proposed by Crane would maintain a standby charge distibution until triggered, at which time it would break down temporarily in the vicinity of the trigger point. The breakdown at this localized point would then spread outward in both directions along the wire, resulting in a propagating breakdown analogous to that of the axon. The recovery of the wire is referred to as the refractory phase of the process, and during this time, as with the forest fire, a discharge is not readily triggered.

A different type of neuristor device is disclosed in copending application Ser. No. 451,362, filed Apr. 27, 1965, by A. J. Cote, Jr., and assigned to the assignee of the present application. In FIGS. 2 and 4 of this copending application there are shown tunnel junction neuristors capable of sustaining attenuationless pulse propagation along the respective lengths thereof in both directions once breakdown is caused by the application of a pulse, as shown, at various points along the neuristor.

Although the invention to be described employs the Cote neuristor described and claimed in the aforementioned copending application, other neuristor devices could be substituted therefor by those skilled in the art without departing from the scope of this invention.

The various neuristor junctions and symbols therefor which were originally suggested in the aforementioned Crane article are equally descriptive of similar structural configurations of the Cote neuristor and deserve elaboration at this point. In FIG. 1A there is shown a neuristor line at various times $t_1$, $t_2$, and $t_3$. When the neuristor line is triggered at the trigger point at time $t_1$, line segment D is in a discharge state and pulse propagation to the left and right of segment D is initiated. When the discharge is propagated as shown at $t_2$, the portion of the neuristor over which propagation has just been sustained is in its refractory state as illustrated by section R of the line. At time $t_3$ a portion of the neuristor beneath the trigger point has completely recovered while portions thereof immediately behind the propagating discharge remain in a refractory state.

In FIG. 1B two pulses travelling toward each other are shown to collide and vanish at the point of collision, leaving the neuristor line free to sustain further propagation a finite time after the collision.

II. *The trigger and refractory junction*

As a result of the neuristor characteristics described in FIGS. 1A and 1B, pulses can be propagated between neuristors by the trigger and refractory junctions shown in FIGS. 1C and 1D respectively. In the trigger junction in FIG. 1C, a pulse entering at 4 moves to the right and triggers similar pulses at the junction, which propagate toward 5 and 6. Since the pulse is being regenerated continually as its propagates, there is no change in pulse level at the junction of FIG. 1C.

Using the refractory junction shown in FIG. 1D, a pulse entering at 7 propagates to the right and leaves at 8 without energizing the line between 9 and 10. Similarly, a pulse entering at 9 leaves at 10 without triggering a pulse on line 7–8. However, when a pulse passes the junction on either line, it temporarily alters the conditions on the other line for a refractory period such that a pulse entering the second line during the refractory period cannot be propagated past the junction and hence dies out. For a further description of the structural arrangement of the refractory junction shown in FIG. 1D, reference should be made to the aforementioned Crane article.

Using the two types of neuristor junctions shown in FIGS. 1C and 1D, neuristors can be interconnected in a variety of ways in order to process information. In the synthesis of neuristor data processing and control systems there are many times when it is necessary to interrupt or modulate the flow of pulses between two portions of a network. For example, this type of function is provided by the control gate of FIG. 9 and the transistor analog of FIG. 11 in the aforementioned Crane article. This function is most frequently performed by variations of the refractory junction as noted in that article.

The disadvantages of using refractory junctions have been recognized by those skilled in the neuristor art. Refractory junctions are not practicably attainable in all of the various realizations of neuristors, and in view of this fact Crane has proposed a series of junction-types referred to as trigger-coupled. These are disclosed in an article by Crane entitled "On The Complete Logic Capability and Reliability of Trigger-Coupled Neuristors," Report No. 262198, published at the Stanford Research Institute (July 1961). The trigger-coupled junctions of interest are shown in FIG. 2.

III. *The trigger-coupled junctions*

FIG. 2A illustrates the $T_u$ junction, and the means of realization shown therein represents, for example, a plan view taken at the p-n junction of the Cote neuristor disclosed in the aforementioned copending application. For the $T_u$ junction a pulse can move from A to B but not from B to A. The junction is realized by varying the width of the neuristor line as shown. In moving from A toward B, the transistion of the neuristor line width for the left-hand portion of the neuristor line is gradual enough to sustain pulse propagation over this portion of the line. When the line suddenly shrinks there is more than sufficient energy to insure propagation of a pulse down the narrow right-hand section of the line. However, when a pulse is applied to B, it is unable to move to A due to the sudden enlargement of the neuristor line which requires more local trigger energy than is available. The effect is similar to the fan-out limitation in a conventional computer.

FIG. 2B illustrates the bifurcated $T_b$ junction which operates on a principle similar to the $T_u$ junction. As a pulse travels from point A to the right, the junction transition is gradual enough so that pulse propagation continues down both the B and the C paths. However, when a single pulse is applied at either B or C and propagates toward A, it encounters a transition in neuristor junction width sufficient to cause the propagation from right to left as shown in FIG. 2B to cease. If however, pulses from B and C are timed so that they will arrive at the junction simultaneously, propagation will continue past the junction toward A.

FIG. 2C illustrates the $T_f$ junction which has the following properties: A pulse entering at C will propagate to both A and B while pulses entering at either A or B will reach only C. This type of behavior is obtained using a combination of bifurcated $T_b$ junctions and trigger junctions. Since the lengths $L_1$ and $L_2$ are equal, pulses entering from C arrive at the B path bifurcated junction together and propagation continues to B. Similar considerations apply to the path links between C and A. Where, however, a pulse enters at either A or B it is unable to reach B or A, respectively, due to the fact that the two paths between A and B are unequal.

IV. *Prior art trigger-coupled networks*

In the past trigger-coupled logic networks have been designed using combinations of $T_u$ and $T_f$ junctions. These networks have been designed either by (1) controlling the line's physical properties, e.g. localized altering of the doping to change the gain in particular regions, or by (2) control of the neuristor line geometry. The former method of design is not particularly attractive from a fabrication standpoint, especially when the Cote neuristor is used. The latter method results in complex junction design to perform relatively simple logic functions.

V. *The invention*

Briefly described, the invention comprises a first and a second $T_b$ bifurcated neuristor junctions which are connected respectively to first and second neuristor lines between which the gating action occurs. A pair of neuristor lines interconnect the bifurcated sections of the $T_b$ neuristor junctions and a source of control signals is applied to one of said pair of lines via $T_u$ neuristor junction. By properly timing the application of control signals at one of the pair of neuristor lines interconnecting the $T_b$ neuristor junctions, the control pulse can be made to collide with the pulse travelling down said one line thereby annihiliating both the control signal and the transmitted pulse. When the pulse travelling down the other of said pair of neuristor lines reaches the $T_b$ junction, it fails to survive the junction and thus the gate becomes open.

Accordingly, it is an object of this invention to provide a new and improved neuristor controlled gate solely by controlling the geometry of the neuristor lines.

It is another object of this invention to provide a new and improved neuristor controlled gate employing combinations of neuristor junctions.

It is still another object of this invention to provide an improved gate of the type described employing only T junctions, $T_u$ junctions, and bifuracted $T_b$ junctions.

Other objects and attendant advantages of this invention will become more readily apparent in the following description of one embodiment thereof when considered in connection with the accompanying drawings wherein.

VI. *Description and operation*

Figure 3:
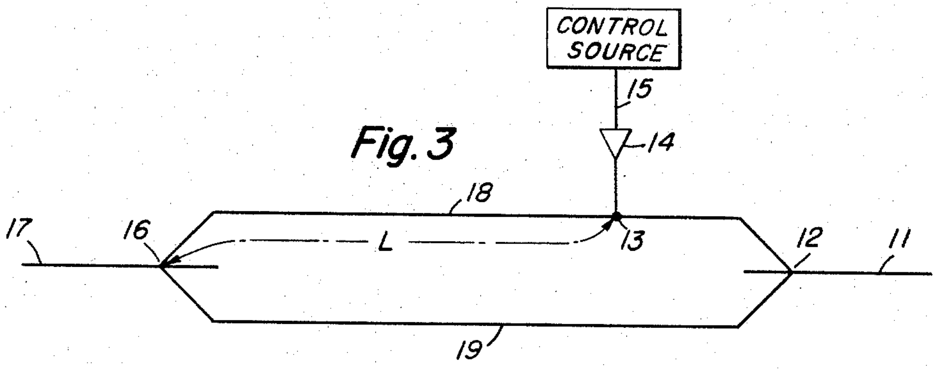
FIG. 3 is a schematic illustration of the basic neuristor controlled gate of this invention employing only T, $T_u$ and $T_b$ structures.

Referring in detail to FIG. 3 there is shown a pair of neuristor lines 11 and 17 between which the neuristor gating circuit is to either be opened or closed depending upon the timing of the application of control signals over neuristor line 15.

A pair of $T_b$ junctions 12 and 16 are connected to the ends of lines 11 and 17 as shown and are further connected to each other via lines 18 and 19. A source of control signals is connected via line 15 and the $T_u$ junction 14 to a T-trigger junction 13 on one of the pair of interconnecting lines 18 and 19.

In the absence of pulses applied over line 15, pulses can be transmitted in either direction between lines 11 and 17. For example, a pulse entering neuristor line 17 reaches the $T_b$ junction at 16 and sends a pulse down each path 18 and 19 toward the other $T_b$ junction 12. The time required for each pulse to travel from 16 to 12 down paths 18 and 19 should be substantially the same and this, of course, means that if the velocity of propagation is equal on each path, the two path lengths must be equal. If however the two paths exhibit different propagation velocities, the path lengths must be altered in order to enable the pulses transmitted thereon to arrive simultaneously at the particular $T_b$ junction toward which they are travelling. This simultaneous arrival at 12 insures that a pulse will leave junction 12 and arrive at 11.

If for any reason only one pulse arrives at 12 from 16, it will not survive the junction 12 and no pulse will be propagated on to line 11. The control of pulses transmitted from 17 to 11 is achieved in the present invention by providing a means for preventing a pulse from travelling the 16–13–12 path and reaching the $T_b$ junction at 12. Such control is accomplished in the following manner.

Figure 1A:
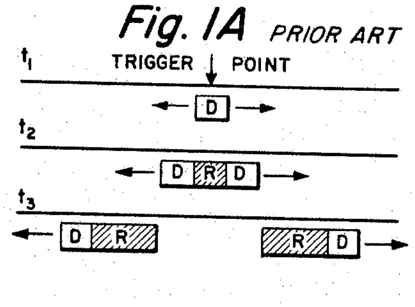
Fig. 1A PRIOR ART
FIG. 1A is a diagrammatic illustration of a triggered neuristor line at various times $t_1$, $t_2$ and $t_3$.
Figure 1B:
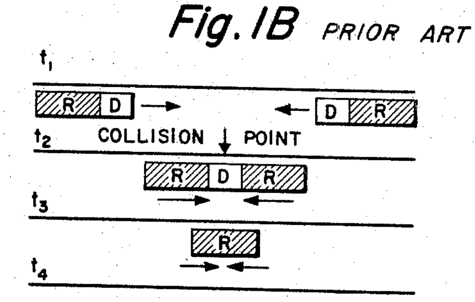
Fig. 1B PRIOR ART
FIG. 1B is a diagrammatic illustration of a neuristor line at various times $t_1$, $t_2$, $t_3$ and $t_4$ as two pulses travel toward each other and collide.
Figure 1C:
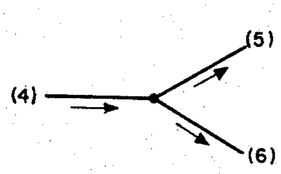
Fig. 1C PRIOR ART
FIG. 1C is a schematic illustration of a neuristor trigger (or T) junction.
Figure 1D:
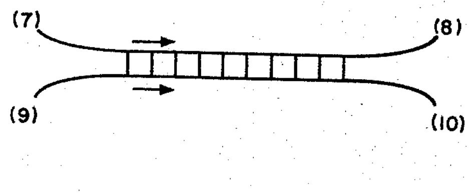
Fig. 1D PRIOR ART
FIG. 1D is a schematic illustration of a neuristor refractory (or R) junction.
Figure 2A:
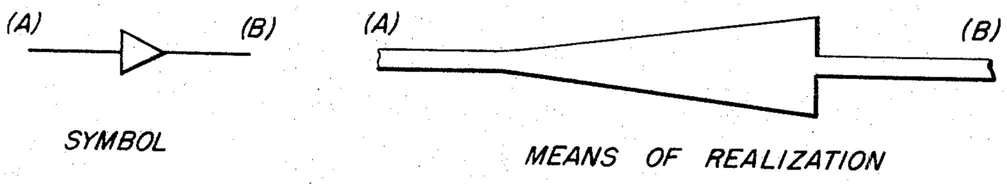
FIG. 2A is a schematic illustration and a plan view of a $T_u$ junction.
Figure 2B:
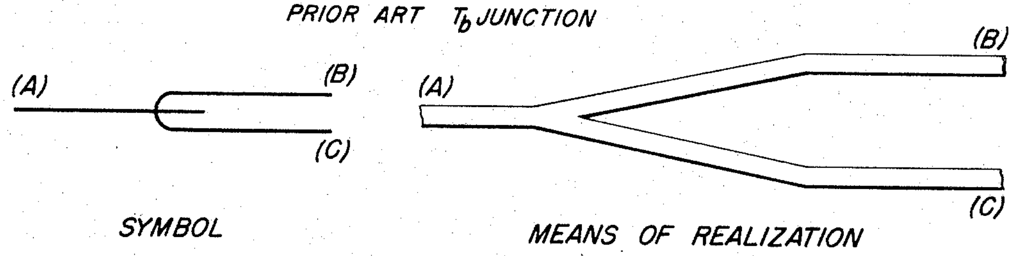
FIG. 2B is a schematic illustration and a plan view of a bifurcated $T_b$ junction.

A pulse entering neuristor line 15 passes the $T_u$ junction 14 as described with reference to FIG. 2A and upon reaching the T-trigger junction 13 sends a pulse toward 12 and a pulse toward 16. If the length of the path from 13 to 16 is L and the pulse travels this path with a velocity of V, the time required to travel this distance is $L/V$. During this time, any pulse travelling from junction 16 to junction 13 would be annihiliated. If the refractory time of the path L is designated T, the total time during which the path L cannot be used is $(L/V+T)$. This of course means that when a signal transmitted from 17 to 11 either collides with a control pulse travelling from 13 to 16 or is prevented from travelling from 16 to 13 during the refractory period thereof, the neuristor line 18 is opened, thereby preventing two pulses from arriving simultaneously at junction 12.

If, however, a control pulse from line 15 reaches trigger junction 13 and sends a pulse in both directions away from 13 just prior to the arrival of a signal pulse at junction 13, the control pulse travelling from 13 to 12 may arrive at junction 12 sufficiently near to the signal pulse arrival via line 19 to enable a pulse to be transmitted from junction 12 down line 11. Whether or not the control pulse will supplant the signal pulse on line 18 in the manner described depends of course upon the time coincidence tolerance of the $T_b$ junction 12. Where the timing of the control pulse provides the necessary time coincidence with the signal pulse transmitted via line 19 e.g. coincidence in arrival at junction 12, the junction 12 can be passed and a pulse transmitted down neuristor line 11.

If the control signal and the signal transmitted down line 18 collide very close to junction 16, the control pulse travelling toward junction 12 will arrive alone and hence not survive junction 12. In such case its effect on the gate operation can be ignored.

The function of the $T_u$ junction 14 is to prevent signal pulses from being coupled to the source of control signals and this function is discussed above with reference to FIG. 2A.

The above description of the control gate illustrated in FIG. 3 has considered the elimination of single pulse and such elimination obviously requires the proper timing of signal and control plus pulses in order to provide signal pulse annihilation on line 18. However, if a train of control pulses is applied at 15, with appropriate pulse spacing, the path between 17 and 11 can be kept open at all times. Due to the $T_b$ junction tolerance, the approximate spacing between control pulses should be less than $2L/V+T$, the extra $L/V$ time being that required for a signal pulse to travel from 16 to 13. This additional $L/V$ time is explained by the following condition: Suppose a control pulse travels from 13 to 16, the line 18 therebetween recovers, and then a signal pulse leaves 16 toward 13, as long as the next control pulse arrives at 13 before the signal pulse does, the signal pulse is effectively intercepted.

In the foregoing description it has been assumed that the pulse transmission to be controlled is from 17 toward 11. It should be emphasized that the transmission in the opposite direction, i.e., from 11 toward 17, can be controlled in a similar manner. In the latter case, the critical times are those for the path between 12 and 13, rather than the path between 16 and 13. Thus the behavior of the gate is not necessarily the same for pulse transmission in either direction, but is in fact dependent upon the location of the trigger junction 13 in the 12–16 path.

Finally, it should be noted with respect to the foregoing discussion that, in general, the velocity of a pulse is to some degree altered as it passes through a junction structure, and this fact should be taken into account in the design of the gate. For example, the T junction at 13 can introduce a difference between the times required to traverse the two paths between 16 and 12 (lines 18 and 19), and if this factor is significant it must be compensated for in order to insure the necessary pulse arrival time coincidence at the $T_b$ junctions 12 and 16.

Figure 2C:
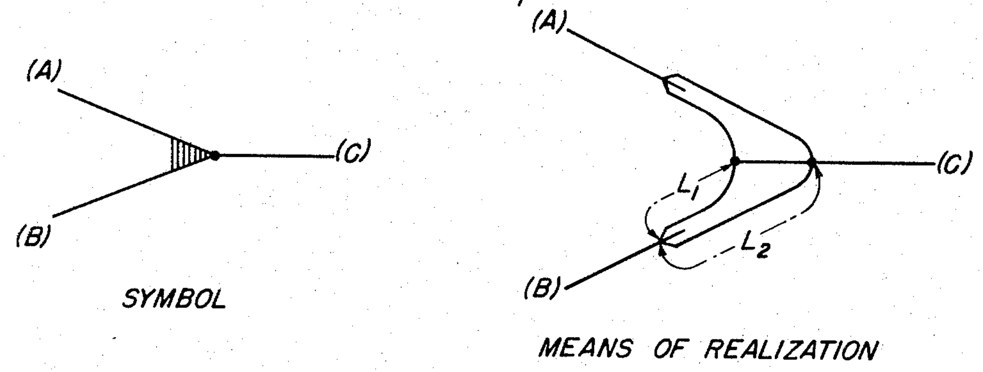
FIG. 2C is a schematic illustration of a $T_f$ junction in a schematic illustration of a $T_f$ junction simulated by interconnected T and $T_b$ junctions.

The invention described above provides numerous improvements over previously known methods for achieving controlled gating performance in neuristor networks, and the gate of this invention is sufficiently flexible in its properties to find a wide variety of applications in neuristor systems. The present invention employs no refractory junctions as such junctions are often impractical in many forms of neuristor realization. The $T_f$ refractory junction shown in FIG. 2C has been excluded in the design of the present invention and these junctions, in their most simple form, require complex fabrication methods. Although the $T_f$ junction can be realized by an appropriate combination of T and $T_b$ junctions, the resulting $T_f$ structure remains complex.

Using only the T, $T_u$ and $T_b$ junctions, the invention described above has been realized by a choice of line geometry rather than an alteration of basic material compositions and it operates on the readily realizable trigger coupling principle.

The present invention employs a new and simplified network for controlling the transmission of pulses between two neuristor lines, and in doing so uses fewer junctions than are used in prior art networks for accomplishing the same result.

It should be understood that various modifications other than those described above may be made in the neuristor gate in FIG. 3 without departing from the spirit and scope of this invention. Accordingly, the invention includes all modifications falling within the scope of the following appended claims.

I claim:

1. A neuristor signal gate for controlling signal passage between neuristor lines comprising (a) a first and a second neuristor junction, each formed by one of said lines and a bifurcated neuristor configuration, the bifurcated sections of which are interconnected via a pair of neuristor paths, (b) unilateral conducting neuristor means connected between a source of control signals and one of said pair of neuristor paths for passing pulses from said source to said one neuristor path whereby the collision of a control pulse with a signal pulse travelling down said one neuristor path annihilates said signal pulse and prevents signal transmission beyond the bifurcated neuristor junction toward which said signal pulse was travelling.

2. The gate of claim 1 wherein
(a) the width of said first and second neuristor junctions is greater than the width of the neuristor line and the width of the bifrucated neuristor sections to which it is joined.

3. The gate of claim 1 wherein
(a) the width transition from a neuristor line to either of said bifurcated neuristor sections to which it is joined is gradual enough to insure pulse propagation from said neuristor line to either of said bifurcated neuristor sections,
(b) the width transition from either of said bifurcated sections to said neuristor line is sufficiently abrupt to impede the propagation of a pulse received from a single one of said bifurcated sections and insufficiently abrupt to impede pulse propagation past said junction when pulses travelling down each of said bifurcated sections arrive at said neuristor junction substantially simultaneously.

4. The gate of claim 1 wherein said unilateral conducting neuristor means includes
(a) a first neuristor section connection to said source and being of gradually increased width along the length thereof, and
(b) a second neuristor section of greatly decreased width joining said first neuristor section and a T-shaped junction on said one path whereby pulses propagating down said first section toward said second section contain sufficient energy to propagate past the junction of said first and second sections whereas pulses propagating down said second section toward said first section contain insufficient energy to propagate past the junction of said first and second sections.

5. The gate of claim 1 wherein
(a) the time during which said gate is open is approximately equal to $L/V+T$ where L is equal to the length of said one path between said T-shaped junction and the neuristor junction at which signal pulses enter, V is equal to the velocity of propagation of said control pulses and T is equal to the refractory time of said one path.

6. The gate of claim 2 wherein
(a) the width transition from a neuristor line to either of said bifurcated sections to which it is joined is gradual enough to insure pulse propagation from said neuristor line to either of said bifurcated sections, and
(b) the width transition from either of said bifurcated section to said nuristor line is sufficiently abrupt to impede the propagation of pulses received from a single bifurcated section but insufficiently abrupt to impede pulse propagation beyond said junction when pulses travelling down both of said bifurcated sections arrive at said junction substantially simultaneously.

7. The gate of claim 6 wherein
(a) said unilateral conducting neuristor means includes a first section connected at one end to said source and having a gradually increased width along the length thereof, said first section abruptly tapering at the point of maximum width thereof into a narrow second section, said second section being connected to said one path at a T-shaped junction, whereby pulses travelling from said source down said first section contain sufficient energy to propagate past the junction of said first and second sections toward said one path whereas pulses travelling down said second section toward the junction of said first and second sections contain insufficient energy to propagate past the junction of said first and second sections toward said source.

8. The gate of claim 7 wherein the time that the path between the neuristor junction at which the signal pulses enter and said T-shaped junction is open to signal pulse transmission is equal to $L/V+T$ where L is equal to the length of said path, V is equal to the velocity of control pulse propagation thereon, and T is equal to the refractory time of said path whereby the maximum necessary spacing between control pulses in order to insure that the gate is open at all times is approximately equal to $2L/V+T$.

9. A neuristor controlled gate for controlling pulse transmission between neuristor lines comprising
(a) a first and a second $T_b$ neuristor junction connected respectively to a separate neuristor line; said $T_b$ junctions being interconnected at the bifurcated sections thereof via a pair of neuristor paths and
(b) means for applying a control pulse to one of said pair of paths whereby the collision of said control pulse with a signal on said one path annihilates said signal and opens said gate.

10. The gate of claim 9 wherein
said means for applying a control pulse includes a $T_u$ neuristor junction connected between a source of control pulses and a T junction on said one path.

No references cited.

ARTHUR GAUSS, *Primary Examiner.*

S. D. MILLER, *Assistant Examiner.*